(12) United States Patent
Gao

(10) Patent No.: US 10,789,766 B2
(45) Date of Patent: Sep. 29, 2020

(54) THREE-DIMENSIONAL VISUAL EFFECT SIMULATION METHOD AND APPARATUS, STORAGE MEDIUM, AND DISPLAY DEVICE

(71) Applicant: TENCENT TECHNOLOGY (SHENZHEN) COMPANY LIMITED, Shenzhen (CN)

(72) Inventor: Bin Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/360,626

(22) Filed: Mar. 21, 2019

(65) Prior Publication Data

US 2019/0221032 A1 Jul. 18, 2019

Related U.S. Application Data

(63) Continuation of application No. PCT/CN2017/110963, filed on Nov. 14, 2017.

(30) Foreign Application Priority Data

Nov. 16, 2016 (CN) .......................... 2016 1 1026997

(51) Int. Cl.
*G06T 15/20* (2011.01)
*G06T 15/00* (2011.01)
(Continued)

(52) U.S. Cl.
CPC ............. *G06T 15/205* (2013.01); *G06T 7/13* (2017.01); *G06T 7/579* (2017.01); *G06T 11/80* (2013.01);
(Continued)

(58) Field of Classification Search
CPC ........ G09G 3/003; G09G 1/06; G06T 15/205; G06T 15/20; G06T 15/005; G06T 11/80; G06T 7/13; G06T 7/579; G06T 2215/12
See application file for complete search history.

(56) References Cited

U.S. PATENT DOCUMENTS 9,070,219 B2 * 6/2015 McArdle ................. G06T 15/20
9,684,412 B2 6/2017 Xia et al.
(Continued)

FOREIGN PATENT DOCUMENTS

CN 103488413 A 1/2014
CN 103797443 A 5/2014
(Continued)

OTHER PUBLICATIONS

Chinese Office Action dated Nov. 22, 2018 in Application No. 201611026997.3 with English categories, 11 pages.
(Continued)

*Primary Examiner* — Brent D Castiaux
(74) *Attorney, Agent, or Firm* — Oblon, McClelland, Maier & Neustadt, L.L.P.

(57) ABSTRACT

A method and an apparatus for three-dimensional (3D) visual effect simulation are provided. A viewpoint movement distance is detected in a display plane. Subsequently, a first movement distance of a first graphic element in the display plane and a second movement distance of a second graphic element in the display plane are determined respectively according to the viewpoint movement distance. The first movement distance is not equal to the second movement distance. Further, a first location of the first graphic element is changed in the display plane according to the first movement distance, and a second location of the second graphic element is changed in the display plane according to the second movement distance.

20 Claims, 9 Drawing Sheets

(51) Int. Cl.
    *G09G 3/00*    (2006.01)
    *G06T 7/579*   (2017.01)
    *G06T 7/13*    (2017.01)
    *G06T 11/80*   (2006.01)
    *G09G 1/06*    (2006.01)

(52) U.S. Cl.
    CPC ............ *G06T 15/005* (2013.01); *G06T 15/20* (2013.01); *G09G 1/06* (2013.01); *G09G 3/003* (2013.01)

(56) References Cited

U.S. PATENT DOCUMENTS

| | | | |
|---|---|---|---|
| 2004/0240709 | A1 | 12/2004 | Shoemaker |
| 2010/0125816 | A1* | 5/2010 | Bezos .................. G06F 1/1626 715/863 |
| 2011/0006978 | A1* | 1/2011 | Yuan ...................... G06F 3/013 345/156 |
| 2013/0016102 | A1* | 1/2013 | Look ....................... G06T 15/20 345/426 |
| 2016/0041641 | A1* | 2/2016 | Xia ....................... G06F 3/0488 345/175 |

FOREIGN PATENT DOCUMENTS

| | | |
|---|---|---|
| CN | 104503092 A | 4/2015 |
| CN | 104661012 A | 5/2015 |
| CN | 105159522 A | 12/2015 |
| CN | 106683152 A | 5/2017 |

OTHER PUBLICATIONS

International Search Report dated Feb. 27, 2018 in PCT/CN2017/110963, with partial English categories, 5 pages.

Written Opinion dated Feb. 27, 2018 in PCT/CN2017/110963, 4 pages.

Chinese Office Action dated Mar. 8, 2018 in Application No. 201611026997.3 with partial English translation, 5 pages.

\* cited by examiner

THREE-DIMENSIONAL VISUAL EFFECT SIMULATION METHOD AND APPARATUS, STORAGE MEDIUM, AND DISPLAY DEVICE

RELATED APPLICATION

This application is a continuation of International Application No. PCT/CN2017/110963, filed on Nov. 14, 2017, which claims priority to Chinese Patent Application No. 201611026997.3, filed on Nov. 16, 2016. The entire disclosures of the prior applications are hereby incorporated by reference in their entirety.

FIELD OF THE TECHNOLOGY

The present disclosure relates to the field of information technologies.

BACKGROUND OF THE DISCLOSURE

A 3D visual effect in display technologies is a stereoscopic visual effect generated when a behavior that a human watches a physical object is simulated.

Dedicated 3D modeling software usually needs to be used in a related process of using a two-dimensional (2D) display screen to simulate a 3D visual effect. The 3D modeling software is specially developed and displays a simulated 3D effect by performing 3D simulation or modeling on a 2D image.

Dedicated 3D modeling software needs to be developed and installed to use such a method of 3D visual effect simulation. The difficulty of software development is high, a large amount of data is processed during modeling, and a large quantity of resources, such as processors, central processing units (CPUs), or memory resources of devices, are consumed.

SUMMARY

In view of this, embodiments of the present disclosure intend to provide a 3D visual effect simulation method and apparatus, a storage medium, and a display device, to resolve a problem that a large amount of calculation is required and a large quantity of resources are consumed to present a 3D visual effect.

According to an aspect of the present disclosure, a method and an apparatus for three-dimensional (3D) visual effect simulation are provided. In the method, a viewpoint movement distance is detected in a display plane. Subsequently, a first movement distance of a first graphic element in the display plane and a second movement distance of a second graphic element in the display plane are determined respectively according to the viewpoint movement distance. The first movement distance is not equal to the second movement distance. Further, a first location of the first graphic element is changed in the display plane according to the first movement distance, and a second location of the second graphic element is changed in the display plane according to the second movement distance.

In an embodiment, the viewpoint movement distance in the display plane is detected based on at least one of a movement distance of an indication cursor in the display plane, a pupil position, or eye tracking information from an eye tracker.

In an embodiment, the first movement distance and the second movement distance are calculated respectively based on: $D=D_{max}*(M/M_{max})$, where M is the viewpoint movement distance, $M_{max}$ is a maximum viewpoint movement distance, D is the first movement distance when $D_{max}$ is a maximum movement distance of the first graphic element, and D is the second movement distance when $D_{max}$ is a maximum movement distance of the second graphic element.

In an embodiment, $M_{max}$ is equal to at least one of a width of a display window at which the first graphic element and the second graphic element are located, a preset value, and a value received from another apparatus.

In an embodiment, a third movement distance of a third graphic element is calculated in the display plane according to the viewpoint movement distance, the first movement distance, and the second movement distance. The display plane includes a plurality of graphic elements and the plurality of graphic elements includes the first, second, and third graphic elements.

In an embodiment, the third movement distance is calculated based on $D_{max}(m)=D_{max}(1)*[Z(m)/Z(Screen)]+D_{max}(n)$, where $D_{max}(n)$ is a maximum movement distance of one of the first and second graphic elements, and $D_{max}(1)$ is a maximum movement distance of the other one of the first and second graphic elements, m is a positive integer in a value range from 2 to n, n is a positive integer equal to or more than 3, $Z(m)$ is a coordinate of a $m^{th}$ graphic element of the graphic elements on a Z axis perpendicular to the display plane, and $Z(Screen)$ is a coordinate of the display plane on the Z axis.

In an embodiment, when a first distance between the first graphic element and the display plane on the Z axis is greater than a second distance between the second graphic element and the display plane on the Z axis, the first movement distance is less than the second movement distance, and the Z axis is perpendicular to the display plane.

In an embodiment, a first coordinate of the first graphic element and a second coordinate of the second graphic element on the Z axis are determined respectively according to a layer superposition sequence of the first graphic element and the second graphic element.

In an embodiment, based on a determination that the first movement distance is greater than a first edge distance, a first ratio of the first movement distance to the first edge distance is calculated, and the first movement distance and the second movement distance are proportionally reduced according to the first ratio. The first edge distance is defined between an original location of the first graphic element and an edge of a display region in a preset movement direction. The display region is a display range of the first graphic element and the second graphic element in the display plane.

In another embodiment, based on a determination that the second movement distance is greater than a second edge distance, a second ratio of the second movement distance to the second edge distance is calculated, and the first movement distance and the second movement distance according to the second ratio are proportionally reduced. The second edge distance is defined between an original location of the second graphic element and the edge of the display region in the preset movement direction.

According to another aspect, a non-transitory computer readable storage medium is disclosed. The non-transitory computer readable storage medium stores instructions which when executed by at least one processor cause the at least one processor to perform any of the methods for three-dimensional (3D) visual effect simulation mentioned above.

In the 3D visual effect simulation method and apparatus provided in the embodiments of the present disclosure, a viewpoint movement distance is detected, a first movement distance of a first graphic element and a second movement distance of a second graphic element are calculated according to the viewpoint movement distance, and then different parallax angles are reflected according to a difference between the first movement distance and the second movement distance, thereby implementing presentation of a 3D visual effect. In the embodiments of the present disclosure, the first movement distance and the second movement distance each are a distance calculated in a display plane, and a relationship between the first movement distance or the second movement distance and the viewpoint movement distance is fairly simple. Compared with 3D modeling, in a 3D visual effect simulation, based on 2D-to-3D mapping, a movement distance in each direction in 3D space is calculated and then is mapped to a 2D view, so that an amount of calculation is greatly reduced and processor and/or memory resources or the like consumed during calculation are reduced.

DESCRIPTION OF EMBODIMENTS

The following further describes the technical solutions of the present disclosure with reference to the accompanying drawings and specific embodiments. It can be understood that, exemplary embodiments described below are merely used to describe and illustrate the present disclosure rather than to limit the present disclosure.

Figure 1:
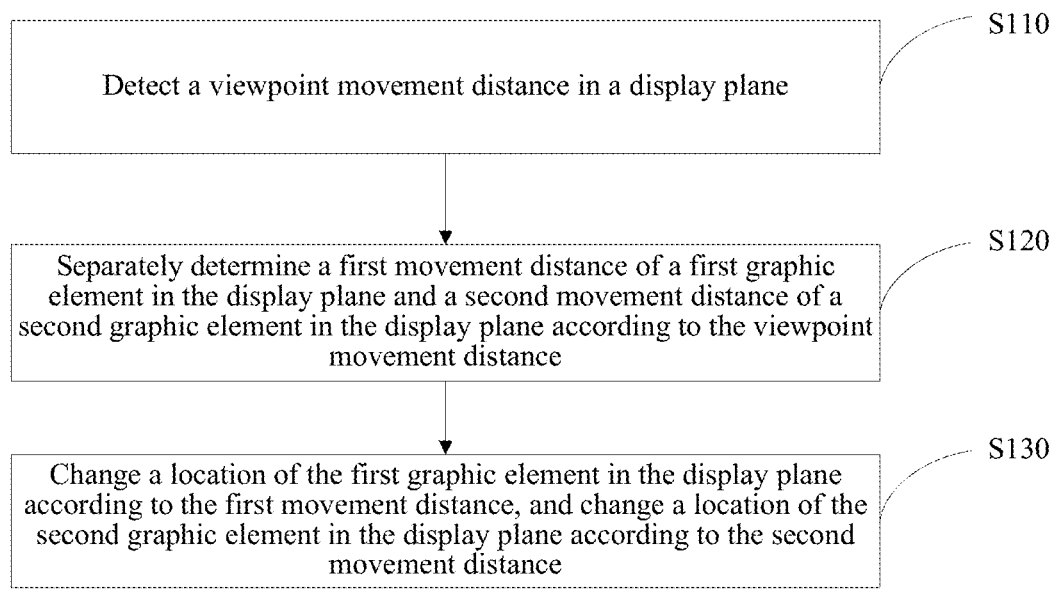
FIG. 1 is a schematic flowchart of a first 3D visual effect simulation method according to an embodiment of the present disclosure.

As shown in FIG. 1, an embodiment of the present disclosure provides a 3D visual effect simulation method, including:

Step S110: Detect a viewpoint movement distance in a display plane.

Step S120: Separately determine a first movement distance of a first graphic element in the display plane and a second movement distance of a second graphic element in the display plane according to the viewpoint movement distance, the first movement distance being not equal to the second movement distance.

Step S130: Change a location of the first graphic element in the display plane according to the first movement distance, and change a location of the second graphic element in the display plane according to the second movement distance.

In this embodiment, a 3D visual effect simulation may be a display method applied to various display devices, for example, applied to various display devices having a display screen such as a mobile phone, a tablet computer or a wearable device. The display plane may be a screen at which a display surface of a display screen is located.

In some embodiments, the method may be applied to a plurality of devices. The plurality of devices may include: a display device and a control device connected to the display device. In step S110, a viewpoint movement distance in a display plane of the display device is detected. The control device performs step S120. The display device may perform step S130.

In this embodiment, a viewpoint movement distance is first detected. In this embodiment, a viewpoint is a focus point of a user in the display plane, for example, a location on which eyes of the user are fixed. In step S110, pupil positioning or eye tracking of an eye tracker may be used for determining a movement distance of the viewpoint in a time slice. In this way, the viewpoint movement distance is obtained. However, during specific implementation, the present disclosure is not limited to the foregoing manner. For example, one time slice may be a check period, for example, 0.1 second, or the like. The viewpoint movement distance may be a linear distance between a location A and a location B after a focus point of the user on a screen moves from the location A to the location B. In brief, the viewpoint movement distance may be a movement distance of a viewpoint of the user in a display plane in a predetermined time.

In this embodiment, the viewpoint movement distance may be detected by pupil positioning or eye tracking.

Figure 2A:
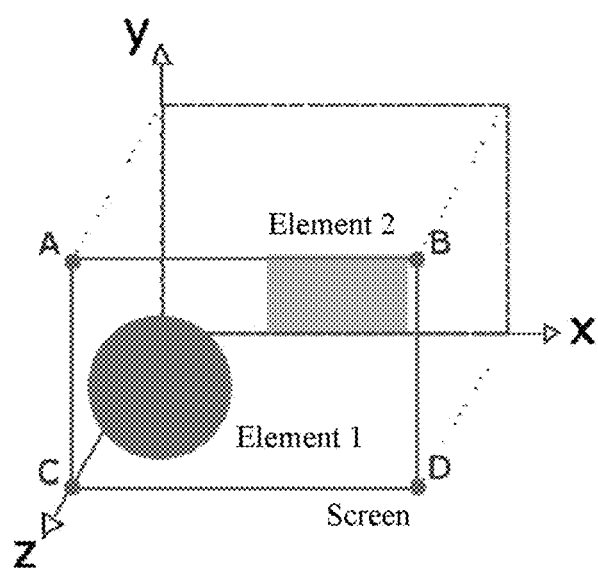
FIG. 2A is a schematic diagram of displaying graphic elements in a 3D coordinate system according to an embodiment of the present disclosure.

In step S120, based on the viewpoint movement distance, movements of the first graphic element and the second graphic element in the display plane are separately determined. For example, as shown in FIG. 2A, the display plane is a plane formed by an X axis and a Y axis. Therefore, the first movement distance of the first graphic element and the second movement distance of the second graphic element calculated in step S120 are both movement distances in the plane formed by the X axis and the Y axis. In FIG. 2A, an element 1 is equivalent to the foregoing first graphic element, and an element 2 may be equivalent to the foregoing second graphic element.

In step S130, the changing a location of the first graphic element in the display plane according to the first movement distance may include: moving the first graphic element by the first movement distance in the display plane. In this embodiment, movement distances of the first graphic element and the second graphic element are different. It is equivalent to that a 3D visual effect is generated for the user. During specific implementation, movement directions of the first graphic element and the second graphic element may be the same or may be different. For example, the movement directions of the two graphic elements are opposite. During specific implementation, movement directions of the first graphic element and the second graphic element are associated with a movement direction of the viewpoint. For example, a mapping relationship between the movement direction of the viewpoint and the movement directions of the graphic elements is established in advance. When the first graphic element and the second graphic element are moved, movement directions of the graphic elements are determined with reference to the movement direction of the viewpoint and the mapping relationship.

Figure 2B:
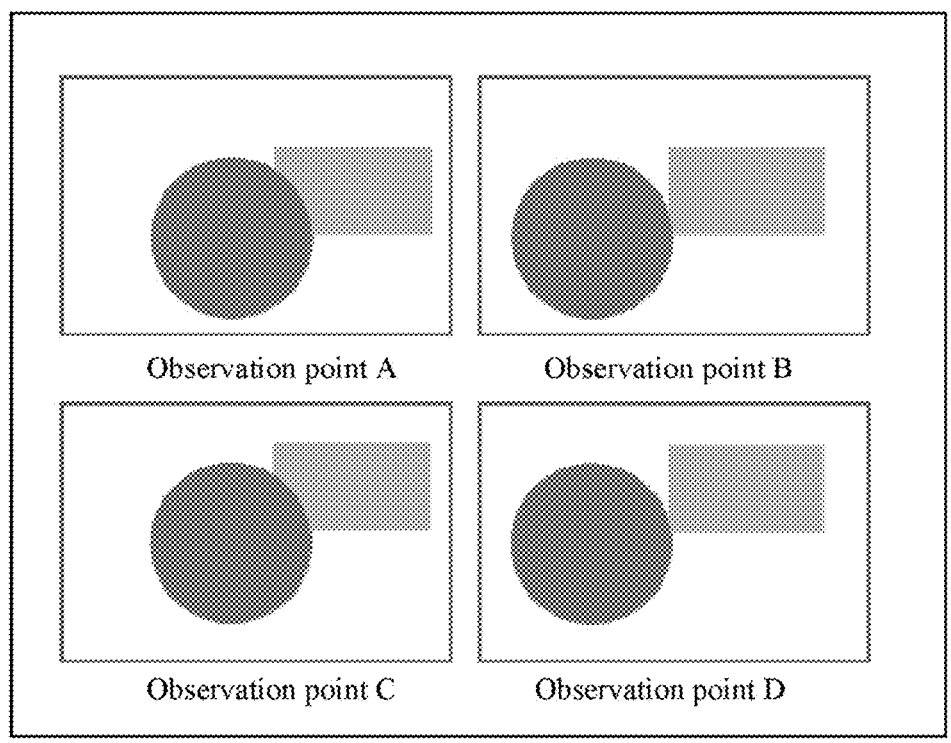
FIG. 2B is a schematic diagram of 2D display of the graphic elements in FIG. 2A formed at different observation points.

For graphic elements in 3D space in FIG. 2A, during observation at different observation points, observed distances between the two elements are different in 2D planes (corresponding to the display plane). Specifically, as shown in FIG. 2B, during observation at an observation point A and an observation point C, the element 1 covers a relatively large part of the element 2, and during observation at an observation point B and an observation point D, the element 1 covers a relatively small part of the element 2. The observation points herein are the foregoing viewpoints. At different observation points, different distances between the two graphic elements in the display plane are seen. In this embodiment, the characteristic is used for changing locations of at least two graphic elements according to the viewpoint movement distance by inconsistent changed movement distances to present a 3D visual effect.

Figure 3:
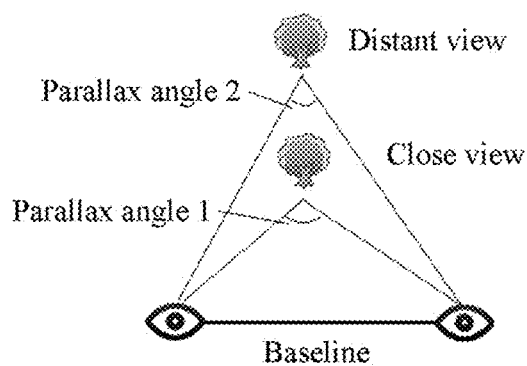
FIG. 3 is a schematic diagram of a parallax angle according to an embodiment of the present disclosure.

Similarly, FIG. 3 is a diagram of a 3D visual effect formed by a parallax. A direction difference is generated when a same target is observed at two points having a particular distance. An angle formed when the two points are seen from the target is called a parallax angle, and the distance between the two points is called a baseline. A parallax is the basis of stereoscopic vision of humans. When the baseline is fixed, the parallax angle is smaller when the target is farther. Commonly, as observed in movement, a nearer object moves faster, and a farther object moves slower. Trees shown in FIG. 3 are at different locations and have different distances from the eyes of a user, so that parallax angles are different, and different visual effects are generated. In this embodiment, the characteristic is used for changing display locations of two different graphic elements by different distances. It is equivalent to that the two graphic elements are moved in different parallax angles, so that display of a 3D visual effect is implemented.

The movement in step S130 may be moving the first graphic element from an original location by the first movement distance, and moving the second graphic element from an original location by the second movement distance. The original locations herein each may be a display location of a graphic element before movement.

In step S120, the first movement distance and the second movement distance may both be linearly calculated according to the viewpoint movement distance. In addition, the first movement distance and the second movement distance both occur in the display plane, and only changes of locations of the graphic elements in the display plane need to be calculated. A movement distance of each element in 3D space is calculated in 3D modeling in the related technology. By comparison, an amount of calculation is significantly reduced, calculation resources are saved, a calculation effect is improved, and a response speed of the 3D visual effect is increased.

In some embodiments, step S110 may include: detecting a movement distance of an indication cursor in the display plane.

In this embodiment, the indication cursor may be a mouse cursor or a keyboard cursor. A mouse movement is usually based on a user operation. If a user moves a mouse, the user's line of sight naturally follows the mouse cursor. Therefore, in this embodiment, a movement of the indication cursor may be used for reflecting a movement distance of a viewpoint of the user in the display plane. The movement distance of the viewpoint is simply referred to as the viewpoint movement distance. For example, step S110 may further include: detecting a movement distance of a focus, and using the movement distance as the viewpoint movement distance. The focus may be a selected tool. For a specific definition of the focus, refer to the related technology, and details are not repeated herein.

In some embodiments, step S120 may further include:

separately determining the first movement distance and the second movement distance based on the following formula:

$$D=D\mathrm{max}*(M/M\mathrm{max}),$$

where M is the viewpoint movement distance, Mmax is a maximum viewpoint movement distance, when Dmax is a maximum movement distance of the first graphic element, D is the first movement distance, and when Dmax is a maximum movement distance of the second graphic element, D is the second movement distance.

In this embodiment, Mmax and Dmax may be preset, or may be received from another device. For example, in each image, Mmax and Dmax are defined in description information of a graphic element for which a 3D visual effect needs to be provided. In this way, Mmax and Dmax may be learned by reading the description information during the calculation of the first movement distance or the second movement distance.

Certainly, the foregoing provides a calculation method. Another method may further be used during specific implementation. It can be learned from the calculation function that, calculation of the first movement distance and the second movement distance is simple and an amount of calculation is small.

Optionally, Mmax is equal to a width of a display window at which the first graphic element and the second graphic element are located. Display is mostly window-based. Windows may include a full-screen window and a small window. A display area of the small window is less than that of the full-screen window. Generally, the display area of the full-screen window is equal to a display area of a display screen in the display plane. During the movement of graphic elements, each graphic element cannot leave an original display window of the graphic element. Therefore, in this embodiment, to ensure normal display, Mmax is equal to a width of the display window at which the first graphic element and the second graphic element are located. Certainly, the width to which Mmax is equal is a width in a movement direction of the first graphic element and the second graphic element. Mmax has different values when movement directions are different, and D also has different eventual values.

In some embodiments, when graphic elements on the display screen further include one or more graphic elements other than the first graphic element and the second graphic element, the method further includes:

calculating a third movement distance of the another graphic element according to the viewpoint movement distance, the first movement distance, and the second movement distance.

In this embodiment, there may be more than one graphic element used for generating a 3D visual effect. For example, a third element, a fourth element, a fifth element, and the like may be included. In this embodiment, a movement distance of each of the other elements is calculated according to the viewpoint movement distance, the first movement distance, and the second movement distance. Thus, uniformity of the moving distance of each graphic element can be ensured, and separate calculation of each of the third movement distances can be avoided.

Figure 4:
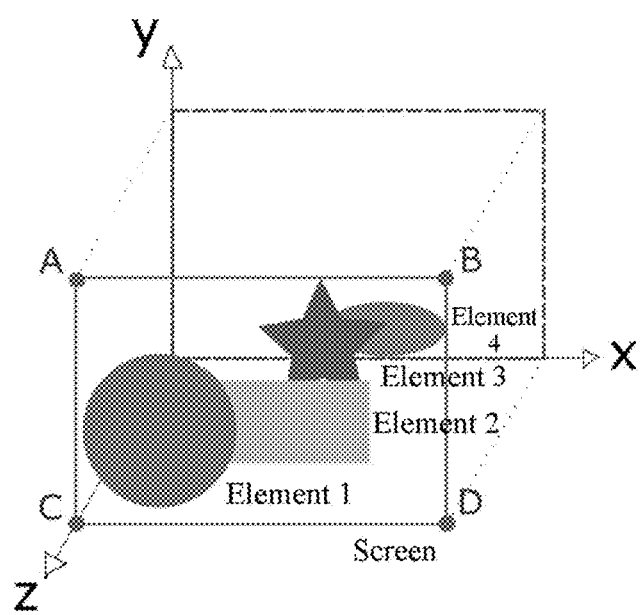
FIG. 4 is another schematic diagram of display of graphic elements in a 3D coordinate system according to an embodiment of the present disclosure.

As shown in FIG. 4, an element 3 and an element 4 in FIG. 4 are equivalent to the foregoing other graphic elements.

Optionally, the calculating a third movement distance of the another graphic element according to the viewpoint movement distance, the first movement distance, and the second movement distance includes:

calculating any third movement distance based on the formula $Dmax(m)=Dmax(1)*[Z(m)/Z(Screen)]+Dmax(n)$, where when $Dmax(1)$ is a maximum movement distance of the first graphic element, $Dmax(n)$ is a maximum movement distance of the second graphic element, and when $Dmax(1)$ is a maximum movement distance of the second graphic element, $Dmax(n)$ is a maximum movement distance of the first graphic element, m is a positive integer in a value range from 2 to n, n is a positive integer not less than 3, $Z(m)$ is a coordinate of the $m^{th}$ graphic element on a Z axis perpendicular to the display screen, and $Z(Screen)$ is a coordinate of the display plane on the Z axis.

$Z(m)$ and $Z(Screen)$ may both be preset. Certainly, $Z(m)$ may be automatically generated by a device, for example, may be automatically determined according to a display area of each graphic element for which a 3D visual effect is generated. For example, assuming that the display area is correlated to a value of $Z(m)$, a larger display area indicates a smaller distance between $Z(m)$ and the display plane on a Z axis. The foregoing is merely an example, and specific implementation is not limited to any foregoing method.

For example, when a distance between the first graphic element and the display plane on the Z axis is greater than a distance between the second graphic element and the display plane on the Z axis, the first movement distance is less than the second movement distance, the Z axis being perpendicular to the display plane. In this case, it may be seen from the perspective of a user that a movement distance of a distant view is small and a movement distance of a close view is large, so that a 3D visual effect can be generated.

In some embodiments, the method further includes:

separately determining a coordinate of the first graphic element and a coordinate of the second graphic element on the Z axis according to a layer superposition sequence of the first graphic element and the second graphic element.

For example, some images are formed by superposing a plurality of layers, and different graphic elements may be located on different layers. In this embodiment, a coordinate of a graphic element on the Z axis may be determined according to a layer on which the graphic element is located, so that it is equivalent to that a distance between the graphic element and the display plane on the Z axis is determined. Certainly, the foregoing describes determining a coordinate of a graphic element according to a distance. Certainly, during specific implementation, coordinates of graphic elements on the Z axis may further be determined according to a covering relationship between the graphic elements. For example, a distance between a covered graphic element and the display plane on the Z axis is large, and a distance between an uncovered graphic element and the display plane on the Z axis is small. Certainly, the foregoing provides several implementations.

Optionally, the method further includes:

calculating a first ratio of the first movement distance to a first edge distance when the first movement distance is greater than the first edge distance that is between an original location of the first graphic element and an edge of a display region in a preset movement direction, the display region being a display range of the first graphic element and the second graphic element that are located in the display plane; and proportionally reducing the first movement distance and the second movement distance according to the first ratio; or, calculating a second ratio of the second movement distance to a second edge distance when the second movement distance is greater than the second edge distance that is between an original location of the second graphic element to an edge of the display region in a preset movement direction; and proportionally reducing the first movement distance and the second movement distance according to the second ratio.

The display region herein is equivalent to a region in which the first graphic element and the second graphic element are movable in the display plane, to prevent a movement from exceeding the range. For example, the movement crosses a boundary of a display window. The display window herein may be a type of display region. In this embodiment, the first ratio is calculated, and the corresponding graphic elements are proportionally reduced and then moved, so that an adequate 3D visual effect can be achieved.

Figure 5A:
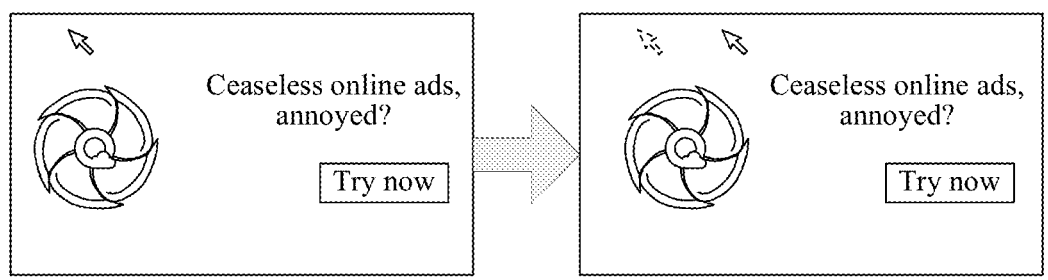
FIG. 5A is a diagram 1 showing a display change implemented by using a 3D visual effect simulation method according to an embodiment of the present disclosure.
Figure 5B:
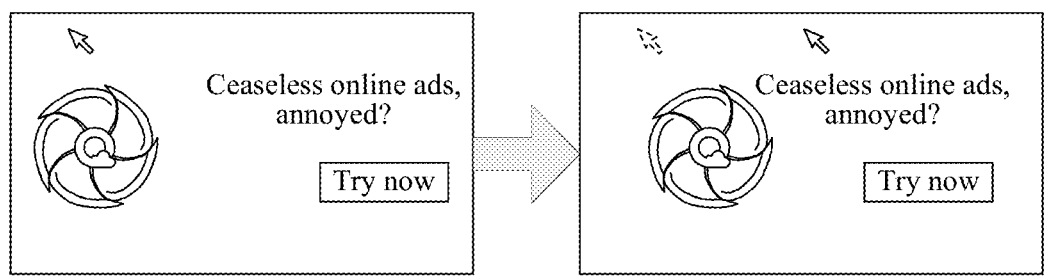
FIG. 5B is a diagram 2 showing a display change implemented by using a 3D visual effect simulation method according to an embodiment of the present disclosure.

FIG. 5A and FIG. 5B are diagrams showing display effects of changing a distance between two graphic elements based on a movement distance of a mouse cursor by using a method according to an embodiment of the present disclosure. In FIG. 5A and FIG. 5B, graphic elements whose display locations change may include an annular graphic element and a text graphic element "Ceaseless online ads, annoyed?". In images on the right in FIG. 5A and FIG. 5B, a dotted-line arrow indicates an original location of a mouse cursor, and a solid-line arrow indicates a location of the mouse cursor after movement. It can be learned by comparing FIG. 5A with FIG. 5B that the movement distance of the mouse cursor is positively correlated with a change amount of relative locations of the graphic elements.

Figure 6:
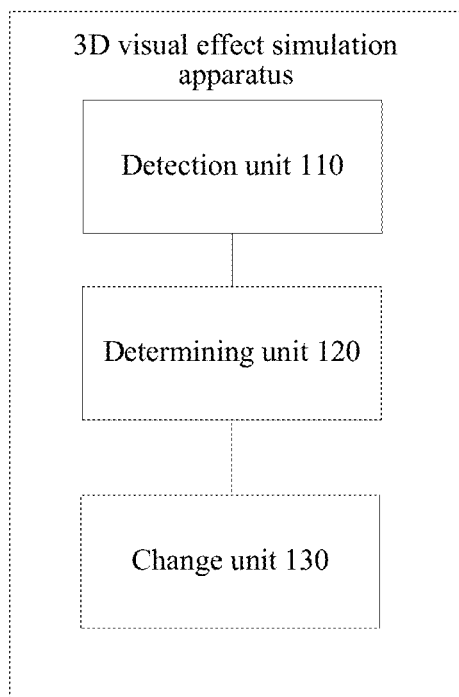
FIG. 6 is a schematic structural diagram of a 3D visual effect simulation apparatus according to an embodiment of the present disclosure.

As shown in FIG. 6, an embodiment of the present disclosure provides a 3D visual effect simulation apparatus, including:

a detection unit 110, configured to detect a viewpoint movement distance in a display plane;

a determining unit 120, configured to separately determine a first movement distance of a first graphic element in the display plane and a second movement distance of a second graphic element in the display plane according to the viewpoint movement distance, the first movement distance being not equal to the second movement distance; and a change unit 130, configured to: change a location of the first graphic element in the display plane according to the first movement distance, and change a location of the second graphic element in the display plane according to the second movement distance.

The apparatus in this embodiment may be an information processing structure applied to various display devices. The display device may be various display terminals such as a mobile phone, a tablet, a wearable device, a desktop computer, a notebook computer or an ebook.

The detection unit 110, the determining unit 120, and the change unit 130 may all correspond to a processor or a processing circuit. The processor may include a central processing unit, a microprocessor, a digital signal processor, a programmable array, or the like. The processing circuit may include an application-specific integrated circuit.

The processor or processing circuit may implement the foregoing function by executing specified code.

In some embodiments, the detection unit 110 is configured to detect a movement distance of an indication cursor in the display plane. The detection unit 110 may include a structure such as a mouse or a detection panel for detecting a movement operation of the indication cursor.

Optionally, the determining unit 120 is configured to separately determine the first movement distance and the second movement distance based on the following formula:

$$D = Dmax*(M/Mmax),$$

where M is the viewpoint movement distance, Mmax is a maximum viewpoint movement distance, when Dmax is a maximum movement distance of the first graphic element, D is the first movement distance, and when Dmax is a maximum movement distance of the second graphic element, D is the second movement distance.

In this embodiment, the determining unit 120 corresponds to a calculator or a calculation circuit, or a processor or processing circuit having a calculation function. The determining unit 120 may be configured to calculate the first movement distance or the second movement distance.

Optionally, Mmax is equal to a width of a display window at which the first graphic element and the second graphic element are located.

In some other embodiments, the determining unit 120 is further configured to: when graphic elements on the display screen further include one or more graphic elements other than the first graphic element and the second graphic element, calculate a third movement distance of the another graphic element according to the viewpoint movement distance, the first movement distance, and the second movement distance.

In this embodiment, to avoid separate calculation of a movement distance of each graphic element to cause inconsistency of movement distance, in this embodiment, movement distances are determined according to movement distances of the first graphic element and the second graphic element.

Optionally, the determining unit 120 is further configured to calculate any third movement distance based on the formula Dmax(m)=Dmax(1)*[Z(m)/Z(Screen)]+Dmax(n), where when Dmax(1) is a maximum movement distance of the first graphic element, Dmax(n) is a maximum movement distance of the second graphic element, and when Dmax(1) is a maximum movement distance of the second graphic element, Dmax(n) is a maximum movement distance of the first graphic element, m is a positive integer in a value range from 2 to n, n is a positive integer not less than 3, Z(m) is a coordinate of the $m^{th}$ graphic element on a Z axis perpendicular to the display screen, and Z(Screen) is a coordinate of the display plane on the Z axis.

In brief, in this embodiment, the determining unit 120 may perform calculation according to the foregoing functional relationship, but this embodiment is not limited to the foregoing functional relationship.

In addition, when a distance between the first graphic element and the display plane on the Z axis is greater than a distance between the second graphic element and the display plane on the Z axis, the first movement distance is less than the second movement distance, the Z axis being perpendicular to the display plane. In this case, it can be implemented that a movement distance of a distant view is small and a movement distance of a close view is large, so that a 3D visual effect is generated A coordinate of each graphic element on the Z axis is determined by using various determining structures. For example, the determining unit 120 may determine a coordinate according to an operation indication obtained by a man-machine interaction interface. In this embodiment, the determining unit 120 is further configured to: separately determine a coordinate of the first graphic element and a coordinate of the second graphic element on the Z axis according to a layer superposition sequence of the first graphic element and the second graphic element. In brief, in this embodiment, the distance on the Z axis may be a corresponding virtual distance or equivalent distance according to a superposition sequence of layers or a superposition sequence of different graphic elements.

In addition, the determining unit 120 is specifically configured to: calculate a first ratio of the first movement distance to a first edge distance when the first movement distance is greater than the first edge distance that is between an original location of the first graphic element and an edge of a display region in a preset movement direction, the display region being a display range of the first graphic element and the second graphic element that are located in the display plane; and proportionally reduce the first movement distance and the second movement distance according to the first ratio; or, calculate a second ratio of the second movement distance to a second edge distance when the second movement distance is greater than the second edge distance that is between an original location of the second graphic element to an edge of the display region in a preset movement direction; and proportionally reduce the first movement distance and the second movement distance according to the second ratio.

According to an embodiment of the present disclosure, a 3D visual effect simulation method is provided. The 3D visual effect simulation method is applied to a display device, the display device including: a display, one or more processors, a memory, and one or more programs, the one or more programs being stored in the memory, the program being capable of including one or more units each corresponding to a group of instructions, the one or more processors being configured to execute the instructions, and the method including:

detecting a viewpoint movement distance in a display plane;

separately determining a first movement distance of a first graphic element in the display plane and a second movement distance of a second graphic element in the display plane according to the viewpoint movement distance, the first movement distance being not equal to the second movement distance; and changing a location of the first graphic element in the display plane according to the first movement distance, and changing a location of the second graphic element in the display plane according to the second movement distance.

Optionally, the detecting a viewpoint movement distance in a display plane includes:

detecting a movement distance of an indication cursor in the display plane.

Optionally, the separately determining a first movement distance of a first graphic element in the display plane and a second movement distance of a second graphic element in the display plane according to the viewpoint movement distance includes:

separately determining the first movement distance and the second movement distance based on the following formula:

$$D = D\max * (M/M\max),$$

where M is the viewpoint movement distance, Mmax is a maximum viewpoint movement distance, when Dmax is a maximum movement distance of the first graphic element, D is the first movement distance, and when Dmax is a maximum movement distance of the second graphic element, D is the second movement distance.

Optionally, Mmax is equal to a width of a display window at which the first graphic element and the second graphic element are located.

Optionally, when graphic elements on the display screen further includes one or more graphic elements other than the first graphic element and the second graphic element, the method further includes:

calculating a third movement distance of the another graphic element according to the viewpoint movement distance, the first movement distance, and the second movement distance.

Optionally, the calculating a third movement distance of the another graphic element according to the viewpoint movement distance, the first movement distance, and the second movement distance includes:

calculating any third movement distance based on the formula $D\max(m) = D\max(1) * [Z(m)/Z(\text{Screen})] + D\max(n)$, where when Dmax(1) is a maximum movement distance of the first graphic element, Dmax(n) is a maximum movement distance of the second graphic element, and when Dmax(1) is a maximum movement distance of the second graphic element, Dmax(n) is a maximum movement distance of the first graphic element, m is a positive integer in a value range from 2 to n, n is a positive integer not less than 3, $Z(m)$ is a coordinate of the $m^{th}$ graphic element on a Z axis perpendicular to the display screen, and Z(Screen) is a coordinate of the display plane on the Z axis.

Optionally, when a distance between the first graphic element and the display plane on the Z axis is greater than a distance between the second graphic element and the display plane on the Z axis, the first movement distance is less than the second movement distance, the Z axis being perpendicular to the display plane.

Optionally, the method further includes:

separately determining a coordinate of the first graphic element and a coordinate of the second graphic element on the Z axis according to a layer superposition sequence of the first graphic element and the second graphic element.

Optionally, the method further includes:

calculating a first ratio of the first movement distance to a first edge distance when the first movement distance is greater than the first edge distance that is between an original location of the first graphic element and an edge of a display region in a preset movement direction, the display region being a display range of the first graphic element and the second graphic element that are located in the display plane; and proportionally reducing the first movement distance and the second movement distance according to the first ratio;

Optionally, the method further includes:

calculating a second ratio of the second movement distance to a second edge distance when the second movement distance is greater than the second edge distance that is between an original location of the second graphic element to an edge of the display region in a preset movement direction; and proportionally reducing the first movement distance and the second movement distance according to the second ratio.

In some embodiments, a camera may be used for collecting a viewpoint movement distance of a user; or, an eye tracker may be used for collecting the viewpoint movement distance. A calculator is used for calculating the first movement distance and the second movement distance. A display updates a location of the first graphic element and a location of the second graphic element based on the first movement distance and the second movement distance.

Figure 7:
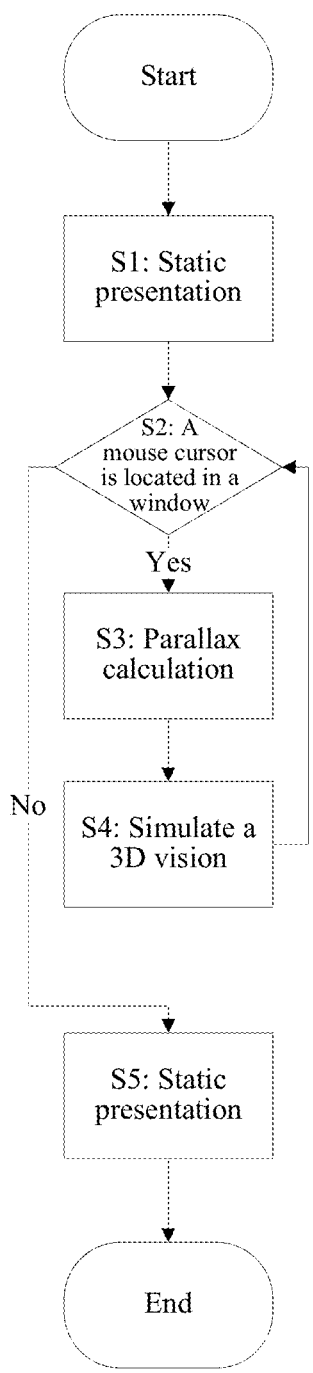
FIG. 7 is a schematic flowchart of a second 3D visual effect simulation method according to an embodiment of the present disclosure.

An embodiment of the present disclosure further provides a computer storage medium, the computer storage medium stores a computer executable instruction, and the computer executable instruction, when executed by one or more processors, can be configured to perform the foregoing 3D visual effect simulation method provided by any one or more technical solutions, for example, the method shown in FIG. 1 and/or FIG. 7.

The computer storage medium may be various storage media such as an optical disc, a removable hard disk, and a flash drive. The computer storage medium may be a non-transitory storage medium.

An embodiment of the present disclosure provides a display device, including:

a display screen, configured to perform display;

a memory, configured to store a computer executable instruction; and processor, connected to the display screen and the memory separately, and configured to execute the computer executable instruction to be capable of being configured to implement the foregoing 3D visual effect simulation method provided by any one or more technical solutions, similarly, for example, the method shown in FIG. 1 and/or FIG. 7.

The following provides specific examples with reference to any one of the foregoing embodiments.

Example 1

As shown in FIG. 7, this example provides a 3D visual effect simulation method, including:

Step S1: Static presentation. The static presentation herein may be statically presenting an image or an image element on a web page or an application interface of an application. For example, on a game web page, graphic elements of the game page are statically presented before a game is started. For another example, a social picture is statically presented on a display interface of WeChat.

Step S2: Determine whether a mouse cursor is located in a window, where if yes, the process turns to step S3, or if no, the process turns to step S5. The window herein may be a display window of a whole display screen, or may be a display window of 3D visual simulation. A mouse herein may substantially correspond to a mouse cursor. The mouse cursor is usually a visual focus of a user, for example, a location of a viewpoint of the user. When step S2 is specifically performed, it may further be determined whether a viewpoint corresponding to a contact point or pupil positioning of the user is located in the window. The window herein may be a display interface or display region that can present a dynamic graphic element.

Step S3: Parallax calculation. The parallax calculation may correspond to the foregoing step S120. When a mouse cursor is located in a window, that is, a viewpoint of a user is located in the window, parallax calculation needs to be performed. Specifically, the parallax calculation may include detecting a movement distance of the mouse cursor, and calculating movement distances of at least two graphic elements in the window according to the movement distance of the mouse cursor.

Step S4: Simulate 3D vision. The simulation of 3D vision may correspond to movements of different graphic elements in step S130. After the movement distance of the mouse cursor is calculated, each graphic element is moved according to the movement distance obtained through calculation. Because movement distances of the at least two graphic elements are not equal to each other, a 3D visual effect is generated. As shown in FIG. 5A and FIG. 5B, a distance between an annular graphic element and a text graphic element "Ceaseless online ads, annoyed?" is relatively large before a mouse cursor is moved, and the distance between the two graphic elements decreases after the mouse cursor is moved. In this way, a 3D visual effect that a movement distance of a distant view is small and a movement distance of a close view is large may be generated for the user. As can be learned by comparing FIG. 5A with FIG. 5B, a change of the distance between the two graphic elements is related to the movement distance of the mouse cursor, that is, related to a viewpoint movement distance.

Step S5: Static presentation. When the mouse cursor moves out of the window, it indicates that the viewpoint of the user moves out of the window, and the user no longer pays attention to the display region of the window. To simplify operations on a device, the window restores static display, and the movement distance of the viewpoint is no longer calculated, and the graphic elements are no longer moved, to occupy less calculation resources and processing resources of the device and prevent the load of the device from increasing, so that the device has more resources to respond to other operations, and the device performs other operations at an increased response speed.

It should be noted that the method provided in this example may be applied to various display scenarios, and is exemplarily applied to a display scenario using a first-person perspective in this example. The first-person perspective indicates a display mode in which a display scenario and/or content is moved as the viewpoint of the user moves. For example, in a display scenario, a user moves a cursor to change scenes in a game. Video display is a display scenario in which a perspective other than the first-person perspective is used for display.

The following uses a movement of a mouse cursor as an example. Specifically, the following formula may be used, to calculate movement distances of elements during 3D visual simulation.

When movement distances of observation points are the same, the close view (an element 1) moves fast, and the distant view (an element 2) moves slow. The movement distances may be calculated according to the following formula:

$$D = D\mathrm{max} * (M/M\mathrm{max})$$

Dmax: Maximum movement distance
M: Movement distance of an observation point
Mmax: Maximum movement distance of an observation point The movement distance (M) of the observation point is a movement distance of a mouse cursor, and the maximum movement distance of the observation point (Mmax) is a size of a presentation window. The key to calculating the movement distance (D) is to find appropriate Dmax. The close view needs relatively large Dmax, and the distant view needs relatively small Dmax. In this way, 3D visual simulation is converted into selection of Dmax. The observation point is the foregoing viewpoint.

Dmax has different selection solutions according to different application scenarios. In a scenario of a computer manager, two static pictures are used for simulation in a pop-up recommendation window. The scenario is relatively simple, and a movement distance may be fixed. Dmax of the close view and Dmax of the distant view are directly manually specified to 10 pixels and 5 pixels.

In a more complex scenario, there may be n visual elements. When an observation point moves, an element that is closer to a screen moves faster. Dmax(m) of the $m^{th}$ element may be calculated by using the following formula:

$$D\mathrm{max}(m) = D\mathrm{max}(1) * [Z(m)/Z(\mathrm{Screen})] + D\mathrm{max}(n)$$

Dmax(1): Maximum movement distance of the closest (the first) element
Dmax(n): Maximum movement distance of the farthest (the $n^{th}$) element
Z(m): Coordinate of the $m^{th}$ element on the z axis
Z(Screen): Coordinate of the screen on the z axis Example 2

Figure 8:
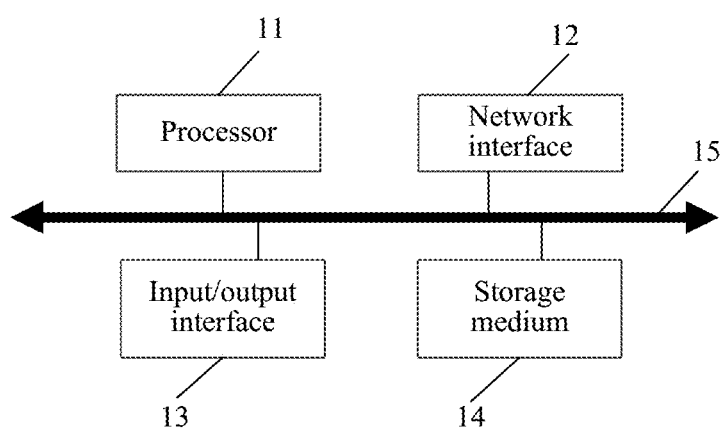
FIG. 8 is a schematic structural diagram of another 3D visual effect simulation apparatus according to an embodiment of the present disclosure.

As shown in FIG. 8, this example provides a schematic diagram of an optional hardware structure of a 3D visual effect simulation apparatus. The apparatus includes a processor 11, an input/output interface 13 (for example, a display screen, a touchscreen, or a speaker), a storage medium 14, and a network interface 12. These components may be connected to and communicate with each other by using a system bus 15. Correspondingly, the storage medium 14 stores an executable instruction for performing the three-dimensional visual effect simulation method recorded in the embodiments of the present disclosure. Some or all of the hardware modules shown in FIG. 8 may be implemented according to requirements or another hardware module may be implemented. One or more hardware modules of various types may be provided. The hardware modules may be implemented at a same geographical location or may be distributed at different geographical locations for implementation, and may be used for performing the 3D visual effect simulation method shown in FIG. 1, FIG. 5, and FIG. 8.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of the present disclosure may be all integrated in a processing module, each unit is separately used as one unit, or two or more units are integrated in one unit. The integrated unit may be implemented in a form of hardware, or may be implemented in form of hardware plus a software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disc.

Alternatively, when the integrated unit of the present disclosure is implemented in a form of a software functional module and sold or used as an independent product, the integrated unit may be stored in a computer readable storage medium. Based on such an understanding, the technical solutions of the embodiments of the present disclosure essentially, or the part contributing to the related technology may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any medium that can store program code, such as a removable storage device, a ROM, a magnetic disk, or an optical disc.

The foregoing descriptions are merely specific implementations of the present disclosure, but the protection scope of the present disclosure is not limited thereto. Any modification made by a person skilled in the art in accordance with the principle of the present disclosure shall be understood as falling within the protection scope of the present disclosure.

INDUSTRIAL PRACTICABILITY

In the technical solutions provided in the embodiments of the present disclosure, to provide a displayed image with a 3D stereoscopic effect, locations of different graphic elements in a display plane are changed according to detected viewpoint movement distances of a user, and a stereoscopic effect is presented through changes of the locations. Compared with a related manner such as 3D modeling, the technical solutions provided in the embodiments of the present disclosure have characteristics of a small amount of calculation and a high response speed and therefore produce a positive industrial effect. The technical solutions may be implemented by running a computer executable instruction such as a corresponding computer program on a display device and have a characteristic of high implementability.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for three-dimensional (3D) visual effect simulation, comprising:
   detecting, by processing circuitry of an apparatus, a viewpoint movement distance in a display plane;
   determining, by the processing circuitry, a first movement distance of a first graphic element in the display plane based on a first linear relationship between the viewpoint movement distance and a maximum movement distance of the first graphic element;
   determining a second movement distance of a second graphic element in the display plane based on a second linear relationship between the viewpoint movement distance and a maximum movement distance of the second graphic element, the first movement distance being not equal to the second movement distance; and
   changing, by the processing circuitry, a first location of the first graphic element in the display plane according to the first movement distance, and a second location of the second graphic element in the display plane according to the second movement distance.

2. The method according to claim 1, wherein the detecting comprises at least one of:
   detecting, by the processing circuitry, a movement distance of an indication cursor in the display plane to define the viewpoint movement distance;
   detecting, by the processing circuitry, the viewpoint movement distance based on a pupil position; and
   detecting, by the processing circuitry, the viewpoint movement distance based on eye tracking information from an eye tracker.

3. The method according to claim 1, wherein
   the determining the first movement distance includes determining, by the processing circuitry, the first movement distance based on $D1=Dmax1*(M/Mmax)$,
   the determining the second movement distance includes determining, by the processing circuitry, the second movement distance based on $D2=Dmax2*(M/Mmax)$, and
   M is the viewpoint movement distance, Mmax is a maximum viewpoint movement distance, D1 is the first movement distance, Dmax1 is the maximum movement distance of the first graphic element, D2 is the second movement distance, and Dmax2 is the maximum movement distance of the second graphic element.

4. The method according to claim 3, wherein
   Mmax is equal to at least one of a width of a display window at which the first graphic element and the second graphic element are located, a preset value, and a value received from another apparatus.

5. The method according to claim 1, further comprising:
   calculating a third movement distance of a third graphic element in the display plane according to the viewpoint movement distance, the first movement distance, and the second movement distance, wherein
   the display plane includes a plurality of graphic elements, the plurality of graphic elements including the first, second, and third graphic elements.

6. The method according to claim 5, wherein the calculating comprises:
   calculating the third movement distance based on $Dmax(m)=Dmax(1)*[Z(m)/Z(Screen)]+Dmax(n)$,
   wherein Dmax(n) is the maximum movement distance of one of the first and second graphic elements, and Dmax(1) is the maximum movement distance of the other one of the first and second graphic elements, m is a positive integer in a value range from 2 to n, n is a positive integer equal to or more than 3, and Z(m) is a coordinate of a $m^{th}$ graphic element of the graphic elements on a Z axis perpendicular to the display plane, and Z(Screen) is a coordinate of the display plane on the Z axis.

7. The method according to claim 6, wherein, when a first distance between the first graphic element and the display plane on the Z axis is greater than a second distance between the second graphic element and the display plane on the Z axis, the first movement distance is less than the second movement distance, the Z axis being perpendicular to the display plane.

8. The method according to claim 7, further comprising:
determining a first coordinate of the first graphic element and a second coordinate of the second graphic element on the Z axis respectively according to a layer superposition sequence of the first graphic element and the second graphic element.

9. The method according to claim 1, further comprising:
based on a determination that the first movement distance is greater than a first edge distance that is defined between an original location of the first graphic element and an edge of a display region in a preset movement direction, the display region being a display range of the first graphic element and the second graphic element in the display plane,
calculating a first ratio of the first movement distance to the first edge distance, and
proportionally reducing the first movement distance and the second movement distance according to the first ratio; and
based on a determination that the second movement distance is greater than a second edge distance that is defined between an original location of the second graphic element and the edge of the display region in the preset movement direction,
calculating a second ratio of the second movement distance to the second edge distance, and
proportionally reducing the first movement distance and the second movement distance according to the second ratio.

10. A three-dimensional (3D) visual effect simulation apparatus, comprising:
processing circuitry configured to:
detect a viewpoint movement distance in a display plane;
determine a first movement distance of a first graphic element in the display plane based on a first linear relationship between the viewpoint movement distance and a maximum movement distance of the first graphic element;
determine a second movement distance of a second graphic element in the display plane based on a second linear relationship between the viewpoint movement distance and a maximum movement distance of the second graphic element, the first movement distance being not equal to the second movement distance; and
change a first location of the first graphic element in the display plane according to the first movement distance, and a second location of the second graphic element in the display plane according to the second movement distance.

11. The apparatus according to claim 10, wherein the processing circuitry is configured to perform at least one of:

detecting a movement distance of an indication cursor in the display plane to define the viewpoint movement distance;
detecting the viewpoint movement distance based on a pupil position, and
detecting the viewpoint movement distance based on eye tracking information from an eye tracker.

12. The apparatus according to claim 10, wherein the processing circuitry is configured to:
determine the first movement distance based on D1=Dmax1*(M/Mmax) and the second movement distance based on D2=Dmax2*(M/Mmax),
wherein M is the viewpoint movement distance, Mmax is a maximum viewpoint movement distance, D1 is the first movement distance, Dmax1 is the maximum movement distance of the first graphic element, D2 is the second movement distance, and Dmax2 is the maximum movement distance of the second graphic element.

13. The apparatus according to claim 12, wherein
Mmax is equal to at least one of a width of a display window at which the first graphic element and the second graphic element are located, a preset value, and a value received from another apparatus.

14. The apparatus according to claim 10, wherein the processing circuitry is configured to:
calculate a third movement distance of a third graphic element in the display plane according to the viewpoint movement distance, the first movement distance, and the second movement distance, wherein
the display plane includes a plurality of graphic elements, the plurality of graphic elements including the first, second, and third graphic elements.

15. The apparatus according to claim 14, wherein the processing circuitry is configured to:
calculate the third movement distance based on Dmax(m)=Dmax(1)*[Z(m)/Z(Screen)]+Dmax(n),
wherein Dmax(n) is the maximum movement distance of one of the first and second graphic elements, and Dmax(1) is the maximum movement distance of the other one of the first and second graphic elements, m is a positive integer in a value range from 2 to n, n is a positive integer equal to or more than 3, and
Z(m) is a coordinate of a $m^{th}$ graphic element of the graphic elements on a Z axis perpendicular to the display plane, and Z(Screen) is a coordinate of the display plane on the Z axis.

16. The apparatus according to claim 15, wherein, when a first distance between the first graphic element and the display plane on the Z axis is greater than a second distance between the second graphic element and the display plane on the Z axis, the first movement distance is less than the second movement distance, the Z axis being perpendicular to the display plane.

17. The apparatus according to claim 16, wherein the processing circuitry is configured to:
determine a first coordinate of the first graphic element and a second coordinate of the second graphic element on the Z axis respectively according to a layer superposition sequence of the first graphic element and the second graphic element.

18. The apparatus according to claim 10, wherein the processing circuitry is configured to:
based on a determination that the first movement distance is greater than a first edge distance that is defined between an original location of the first graphic element and an edge of a display region in a preset movement direction, the display region being a display range of the first graphic element and the second graphic element in the display plane, calculate a first ratio of the first movement distance to the first edge distance, and proportionally reduce the first movement distance and the second movement distance according to the first ratio; and based on a determination that the second movement distance is greater than a second edge distance that is defined between an original location of the second graphic element and the edge of the display region in the preset movement direction, calculate a second ratio of the second movement distance to the second edge distance, and proportionally reduce the first movement distance and the second movement distance according to the second ratio.

19. A non-transitory computer readable storage medium storing instructions which when executed by at least one processor cause the at least one processor to perform:

detecting a viewpoint movement distance in a display plane;

determining a first movement distance of a first graphic element in the display plane based on a first linear relationship between the viewpoint movement distance and a maximum movement distance of the first graphic element;

determining a second movement distance of a second graphic element in the display plane based on a second linear relationship between the viewpoint movement distance and a maximum movement distance of the second graphic element, the first movement distance being not equal to the second movement distance; and changing a first location of the first graphic element in the display plane according to the first movement distance, and a second location of the second graphic element in the display plane according to the second movement distance.

20. The non-transitory computer readable storage medium according to claim 19, wherein the determining the first movement distance includes determining the first movement distance based on D1=Dmax1*(M/Mmax), the determining the second movement distance includes determining the second movement distance based on D2=Dmax2*(M/Mmax), and M is the viewpoint movement distance, Mmax is a maximum viewpoint movement distance, D1 is the first movement distance, Dmax1 is the maximum movement distance of the first graphic element, D2 is the second movement distance, and Dmax2 is the maximum movement distance of the second graphic element.

* * * * *